May 2, 1961     M. W. HUBER     2,982,216
PUMP
Filed Dec. 14, 1956
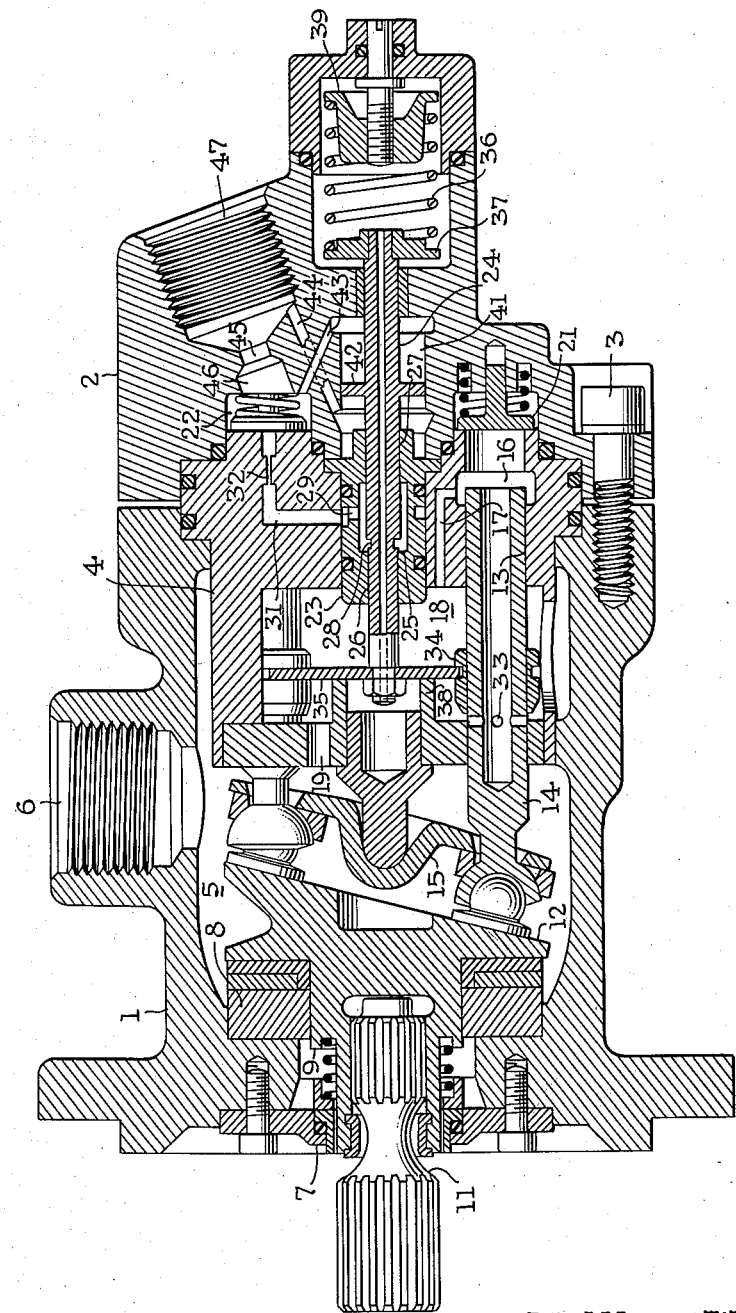
INVENTOR
Matthew W. Huber
BY Dodge and Sons
ATTORNEYS

United States Patent Office 2,982,216
Patented May 2, 1961

2,982,216

PUMP

Matthew W. Huber, Watertown, N.Y., assignor to The New York Air Brake Company, a corporation of New Jersey Filed Dec. 14, 1956, Ser. No. 628,366

3 Claims. (Cl. 103—37)

This invention relates to pumps, and more particularly to a pump especially adapted for use in an emergency hydraulic system for aircraft.

It is a well known practice in the aircraft industry today to provide an emergency hydraulic system for operating the control surfaces and auxiliary equipment when the primary system fails. Quite generally the power source for these systems comprises a motor-pump combination in which the motor is a ram-air turbine mounted outside the aircraft in the air stream. The torque developed by such a turbine is proportional to its rotational speed, and in order to preclude stalling of the turbine it is advisable to equate the load which the pump imposes on the motor to the available torque.

Heretofore, in such systems, constant displacement hydraulic pumps have been used in conjunction with flow-sensitive pressure relief valves which function to limit the pressure in the system. These valves relate the maximum system pressure to the rate of flow and consequently equate the load imposed on the turbine by the pump to the rotational speed of the pump and turbine.

When, in these conventional systems, neither the control surfaces nor the auxiliary equipment is being operated, the entire delivery from the pump is by-passed through the relief valve to the reservoir. This constant circulation of hydraulic fluid through a flow restrictor causes an increase in fluid temperature which adversely affects the performance of the system and ultimately leads to serious maintenance problems. Furthermore, the back-pressure created by this relief valve imposes a continuing load on the pump which in turn loads the turbine. Since the turbine is in the air stream, this continuing load produces an unnecessary and undesirable drag on the aircraft.

The object of this invention is to provide a pump which loads its prime mover in relation to the speed of the latter and which eliminates the need for the flow-sensitive relief valve and therefore is free from the disadvantages associated therewith. Basically the invention comprises the combination of a variable delivery pump whose displacement is normally governed by discharge pressure, and a device which senses rate of discharge and modifies the effect of the pressure control in accordance therewith. In this way the pressure at which pump displacement reduces to a minimum can be made to increase with increasing displacement thereby relating the load (which is a function of pressure) to the speed (which determines rate of flow). Further, since the rate of discharge from the pump itself is now related to the load imposed on the turbine, the need for a flow-sensitive relief valve ceases and its inherent disadvanatges are avoided.

A preferred embodiment of the invention will now be described in relation to the accompanying drawing which is a longitudinal section of the combined pump and displacement control mechanism.

Referring to the drawing, the pump comprises a housing having two sections 1 and 2 which are joined by suitable bolts 3, and which are formed with mating shoulders for securely clamping and holding a cylinder block 4. The section 1 is cored, as shown, to provide an inlet chamber 5 which communicates with a supply reservoir via inlet port 6. Bearings 7 and 8 are mounted in the left-hand end of this section to receive a shaft 9 which is bored and splined at one end to engage a similarly formed coupling member 11. The opposite end of the shaft is enlarged and shaped, as shown, to form a wobble plate 12.

The cylinder block 4 is bored at a plurality of circumferentially spaced points to provide an annular series of cylinders 13. These cylinders receive the pistons 14 which reciprocate therein under the action of wobble plate 12 and nutating plate 15. Each of the cylinders 13 communicates with the inlet chamber 5 via chamber 16, passage 17, chamber 18 and passage 19. The fluid discharging from these cylinders flows through spring-biased check valves 21 to annular discharge chamber 22.

A hollow bushing 23 is mounted in the right-hand end of cylinder block 4 for slidably receiving the rod 24. This bushing has a central chamber 25 connecting two coaxial bores 26 and 27 of different diameters. The rod 24 is formed with two axially extending portions of different diameters separated by an annular groove 28; the smaller diameter portion being slidably received in bore 26 and the larger portion being received in bore 27. The central chamber 25 surrounding the groove 28 communicates with the annular discharge chamber 22 via radial passage 29, passage 31 and choke 32.

Each of the pistons 14 contains a plurality of radial bleed passages 33 which cooperate with the spill-back valves 34, slidably surrounding the pistons, for controlling the effective stroke of the pistons. These valves are attached to the rod 24 by the spider 35 which engages annular grooves formed in the surface of the valves. The valves are normally held in the position shown in the drawing by spring 36 which acts on a plate 37, secured to the right-hand end of rod 24, for biasing the spider into contact with stop 38. As shown, the spring 36 reacts on an adjustable seat 39.

Up to this point the description has related to a well known variable displacement wobble plate pump which will be readily recognized by anyone skilled in the art. The present invention constitutes an improvement of this basic pump which adapts it for use in the peculiar environment previously discussed. The invention comprises the provision of an enlarged cylinder 41 formed in the housing section 2 which snugly but slidably receives the piston 42 carried by rod 24. This cylinder, in conjunction with the piston 42, forms a double-acting fluid motor, the opposite sides of which are connected by passages 43 and 44 to points upstream and downstream, respectively, of the orifice 45. This orifice is positioned in the passage 46 which leads from discharge chamber 22 to the discharge port 47.

*Operation of the invention*

In operation, the pump would be driven by a suitable prime mover, such as a ram-air turbine, through the coupling member 11, and the inlet and discharge ports 6 and 47 would be connected to the supply and demand portions, respectively, of an hydraulic control system. As the shaft 9 rotates, the wobble plate 12 and nutating plate 15 will cause the pistons 14 to reciprocate in cylinders 13. This movement of the pistons draws fluid from the inlet port 6 through chamber 5, passage 19, chamber 18 and passage 17 to the chamber 16 and cylinders 13. From the cylinders, the fluid is forced under pressure through the check valve 21, chamber 22, passage 46 and discharge port 47 to the control system.

As the pressure develops in chamber 22, it is transmitted to chamber 25 via choke 32, and passages 31 and 29. This pressure acts on the radial faces of annular groove 28 and because of the difference in diameter between these two faces, a net force will develop tending to move the rod to the right against the bias of spring 36. When the discharge pressure approaches a predetermined maximum, the force acting on rod 24 will overcome the bias of spring 36, and the rod 24, spider 35 and spill-back valves 34 will move to the right. This movement of the spill-back valves permits the bleed ports 33 to be uncovered for a progressively longer interval during the inward travel of the piston, thereby by-passing increasingly greater quantities of fluid from the cylinders 13. When the spring is fully compressed and the spill-back valves are in the extreme right-hand position, the pump discharge will be at a minimum. It is obvious that when the discharge pressure decreases below this maximum, the pressure force acting on the rod 24 will also decrease and the spill-back valves, under the action of spring 36, will move to the left thereby increasing the pump displacement.

The present invention modifies the previously described conventional control in the following manner. As the fluid which discharges from the chamber 22 passes through the orifice 45, it experiences a drop in pressure proportional to the rate of the flow. The upstream or higher pressure is transmitted by passage 43 to the right-hand side of piston 42, and the downstream or lower pressure is applied to the left-hand side of the piston via passage 44. Because of this pressure unbalance across the piston, a net force is developed which tends to move the piston and the rod 24 to the left in opposition to the fluid force at groove 28. Since it is desirable to keep the pressure drop across orifice 45 as small as possible, it is necessary to make the effective area of piston 42 considerably larger than the effective area at groove 28 so that the forces acting on these areas will be of the same order of magnitude.

If the air turbine driving the pump is operating at high speed, the rate of flow through orifice 45 and consequently the force acting on piston 42 will also be high. Under these conditions, the displacement of the pump will not be reduced until the discharge pressure reaches a relatively high value because the force at groove 28 must overcome a large pressure force at piston 42 in addition to the force of spring 36 before the rod 24 and spill-back valves 34 can move to the right. Thus, when the available torque from the turbine is high, so too, is the load imposed by the pump.

Now if the speed of the turbine is reduced, the flow through the orifice and the force acting on piston 42 will decrease. Under these conditions, the force required at groove 28 to move the rod 24 to the right will be less than before and therefore the maximum discharge pressure will be lower. Thus, as turbine torque decreases, the load imposed by the pump is correspondingly reduced.

It should now be obvious that the present invention affords a simple and effective way of relating the load which the pump imposes on the turbine to the available torque output of the turbine. Further, because of this relationship, the pump discharges fluid only as long as the discharge pressure is below the maximum established for any particular pump speed. Therefore, since the pump does not supply an excess of hydraulic fluid which must be by-passed during periods of system inactivity, the relief valve with its inherent heating and loading disadvantages can be eliminated.

As stated above, the drawing and description relate only to a preferred embodiment of the invention and it will be readily apparent to one skilled in the art that there are many changes which can be made in this structure without departing from the inventive concept. The scope of the invention should not be limited in any respect, except in accordance with the following claims.

What is claimed is:

1. In combination, a pump having a discharge passage; adjustable means movable between minimum and maximum displacement establishing positions for varying the effective displacement of the pump; biasing means connected with the adjustable means for urging it toward its maximum displacement establishing position; actuating means connected with the adjustable means and responsive to the pressure in the discharge passage of the pump for moving the adjustable means toward its minimum displacement establishing position against the bias of the biasing means; and means separate from the actuating means and associated with the discharge passage and with the biasing means for progressively varying the bias exerted by the biasing means directly in accordance with variations in the rate of discharge from the pump.

2. In combination, a pump having a discharge passage; adjustable means movable between minimum and maximum displacement establishing positions for varying the effective displacement of the pump; yielding means connected with the adjustable means for biasing it toward its maximum displacement establishing position; a metering orifice located in the discharge passage; and first and second separate pressure responsive means in fluid communication with the discharge passage and acting on said adjustable means in opposition to each other, the first means being responsive to the pressure drop across said metering orifice and acting in aid of said yielding means, and the second means being responsive to the pressure in the discharge passage of the pump and operable to move the adjustable means toward its minimum displacement establishing position against the bias of the yielding means and the first pressure responsive means.

3. In combination, a pump having an inlet passage and a discharge passage; adjustable means movable between minimum and maximum displacement establishing positions for varying the effective displacement of the pump; spring means connected with the adjustable means for biasing it toward its maximum pump displacement establishing position; a metering orifice in the discharge passage of the pump; a double-acting movable abutment operatively connected with the adjustable means and in fluid communication with the discharge passage, one side of said abutment being subject to the pressure upstream of the metering orifice and operable to urge the adjustable means toward its maximum displacement establishing position, and the other side being subject to the pressure downstream of said orifice and operable to urge the adjustable means in the opposite direction; and a second movable abutment in fluid communication with the discharge passage and operatively connected with the adjustable means, the effective area of the second abutment being much smaller than the effective area of the double-acting movable abutment, the second abutment being subject to the pressure in the discharge passage of the pump and operable to urge the adjustable means toward its minimum displacement establishing position against the bias of the spring means and the double-acting movable abutment.

References Cited in the file of this patent

UNITED STATES PATENTS

| | | |
|---|---|---|
| 1,052,172 | Rateau | Feb. 4, 1913 |
| 1,280,477 | Hopkins | Oct. 1, 1918 |
| 1,467,522 | Amsler | Sept. 11, 1923 |
| 1,899,396 | Ray | Feb. 28, 1933 |
| 2,018,119 | Brouse | Oct. 22, 1935 |
| 2,102,865 | Vickers | Dec. 21, 1937 |
| 2,411,574 | Hunt | Nov. 26, 1946 |
| 2,512,799 | Huber | June 27, 1950 |
| 2,562,615 | Huber | July 31, 1951 |
| 2,600,632 | French | June 17, 1952 |
| 2,600,633 | French | June 17, 1952 |
| 2,678,533 | Lawrence | May 18, 1954 |
| 2,747,598 | Wooldridge | May 29, 1956 |
| 2,944,488 | Meyer | July 12, 1960 |